Dec. 3, 1940.  H. C. LOCKWOOD  2,223,691
BELLOWS
Filed July 21, 1937   2 Sheets-Sheet 1

Inventor
Henry C. Lockwood,
Deceased,
By Isabel Tyte Lockwood,
Administratrix.
BY
ATTORNEY Dec. 3, 1940.  H. C. LOCKWOOD  2,223,691
BELLOWS
Filed July 21, 1937  2 Sheets-Sheet 2

Inventor
Henry C. Lockwood,
Deceased,
By Isabel Tyte Lockwood,
Administratrix.
BY
ATTORNEY Patented Dec. 3, 1940

2,223,691

UNITED STATES PATENT OFFICE 2,223,691

BELLOWS

Henry C. Lockwood, deceased, late of Brooklyn, N. Y., by Isabel Tyte Lockwood, administratrix of the estate of Henry C. Lockwood, deceased, Brooklyn, N. Y.

Application July 21, 1937, Serial No. 154,734

3 Claims. (Cl. 137—156.5)

This invention relates to bellows and pertains, in general, to the type of bellows disclosed and claimed in Lockwood U. S. Patent No. 2,084,496, granted June 22, 1937.

While the invention herein disclosed is capable of general application to all bellows uses, it is particularly well adapted for use in environments of relatively high pressure.

The nature of the invention will be understood from the following description considered in connection with the accompanying drawings, forming a part thereof, and in which.

Like characters of reference refer to like or similar parts throughout the several views.

Figure 4:
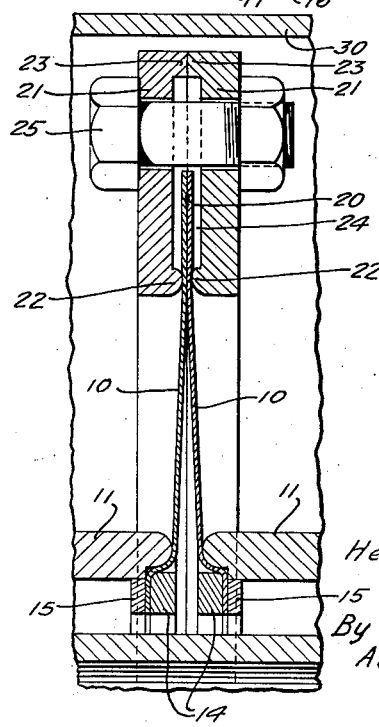
Fig. 4 is a partial sectional view of the expansion joint prior to being subjected to hydraulic pressure.

Referring to the drawings, reference character 10 designates the relatively thin—0.018" thick is suitable for many uses, although other thicknesses, greater or less, may be utilized—corrosion resistant, metallic elements having openings therein, which enter into the movement absorbing portion of the bellows disclosed. These elements may be of stainless steel and may have any desired outer peripheral configuration, such as round, oval, or rectangular. The elements 10 are concentrically disposed and are joined together in pairs adjacent their outer peripheries by electric resistance seam welding in the manner disclosed in the aforesaid Lockwood Patent No. 2,084,496 and in Lockwood Patent No. 2,078,006, granted April 20, 1937. By use of this method, the elements or plates 10 are joined together by fusion of the metal of adjacent plates only with no deposition of extraneous metal, and the joints are fluid pressure tight. Prior to being joined together adjacent their outer peripheries, the elements 10 are flat and have an annular zone adjacent their inner peripheral portions formed as shown in Fig. 4 in the form of an S-curve in preparation for the welding of these portions to the spacer rings 11, and the terminal plates 12 which are disposed at opposite ends of the movement absorbing portion. The spacer rings 11 are dimensioned so that their side edges engage the radially outwardly curved portion 13 of each of the elements 10 and are sufficiently wide to prevent contact of adjacent elements of adjacent pairs of elements when the movement absorbing portion of the bellows is in fully contracted condition. The sides of the spacer rings 11 which are in engagement with the elements 10, are rounded as clearly indicated in the drawings, to provide an easy curving surface about which the elements may flex during expansion and contraction of the bellows. As shown, these easy curving surfaces are arcuate but they may be of other curved configurations suitable for the purpose, if desired. The radially inner portion of each spacer ring constitutes an annular projection, the edges of which engage the elements 10 as illustrated in the drawings, in such manner that the annular recesses between the edges of this extension and the curved sides of the spacer ring receive the radially inwardly disposed curved portion of the elements 10.

The elements 10 are secured to the spacer rings 11 in fluid pressure tight relationship by the welding method disclosed in Lockwood Patent No. 2,145,937, granted February 7, 1939. This method includes the use of welding rings 14 and protective rings 15. Each welding ring is disposed in contact with the inner peripheral portion of each element 10 between the radially outwardly disposed curved portion 13 and the inner periphery of each element, and the width of the welding ring is substantially the width of the extent to which the inner peripheral portion of each element is offset by preforming as previously described. Each protective ring 15 is disposed in contact with the outer peripheral portion of the element 10 in oppositely disposed relationship to the welding ring 14, and extends radially from the inner surface of the spacer ring to the inner peripheral edge of the element. The function of the protective ring 15 is to protect the inner peripheral portion of the element during the application of intense welding heat, all of which is fully described in the aforesaid Lockwood Patent No. 2,145,937, granted February 7, 1939. The application of the welding heat to the protective ring 15 and the inner surface of spacer ring 11 results in the melting of the protective ring 15, the inner peripheral portion of element 10 and the surface portion of the welding ring 14 which is in contact with the element 10 as well as the inner surface of spacer ring 11 adjacent element 10, so that the molten metal together with the metal deposited during the welding process will, when cooled, unite the element 10 to the spacer ring 11 and the welding ring 14, as clearly indicated in Fig. 3. After the adjacent elements of adjacent pairs thereof have been welded as described, the annular space between the welding beads is filled in with welding material indicated 16, to provide a smooth curved surface 17. Each terminal plate 12 is provided with a laterally extending flange 18 which is formed like, and performs the function of, part of spacer ring 11. Each of the terminal elements 10 is secured to flange 18 of each terminal plate in the same manner that the other elements 10 are secured to the spacer ring 11.

The outer weld 20 between each pair of plates or elements 10 is reinforced against stresses tending to separate the joined pairs of plates, by a retaining ring having a pair of cooperating sections 21 each of which has a laterally extending projection 22 arranged and disposed to engage the element 10 radially inwardly of the weld 20. The surface of the projection 22 which engages the element 10 is curved as shown, to provide an easy curved surface about which the element 10 may flex or move during movement of the bellows. The outer peripheral portion of each of the retaining ring sections 21 is provided with a laterally extending flange 23 which is arranged to engage the flange 23 of the other section to provide an annular space 24 between the sections 21 which will receive the outer peripheral portion of a pair of elements 10. The cooperating sections of the retaining rings are secured together by bolts and nuts 25 which are spaced about the ring at suitable intervals. The bolts and nuts 25 of adjacent retaining rings 21 are staggered as indicated, so that they will not come in contact with each other upon contraction of the bellows.

The bellows is provided with an internal sleeve and alignment guide 26 which extends beyond each end of the movement absorbing portion thereof and has one end secured by welding or otherwise, to one of the vanstone necks 27 which are disposed on opposite ends of the bellows. Loose ring flanges 28 having bolt holes 29 provide means for bolting the bellows to the parts with which it is to be used. The external sleeve 30 is provided at its opposite ends with stop rings 31 which are secured to the sleeve 30 by welding or any other convenient means. The sleeve 30 prevents the entry of foreign matter into the movement absorbing portion of the bellows which might cause injury and the stops 31 prevent the expansion of the movement absorbing portion beyond intended limits. As shown, the external sleeve 30 is formed in two parts which are secured together by bolts 32. Terminal plates 12 are welded to the inner end of the vanstone necks 27, as clearly indicated.

Figure 1:
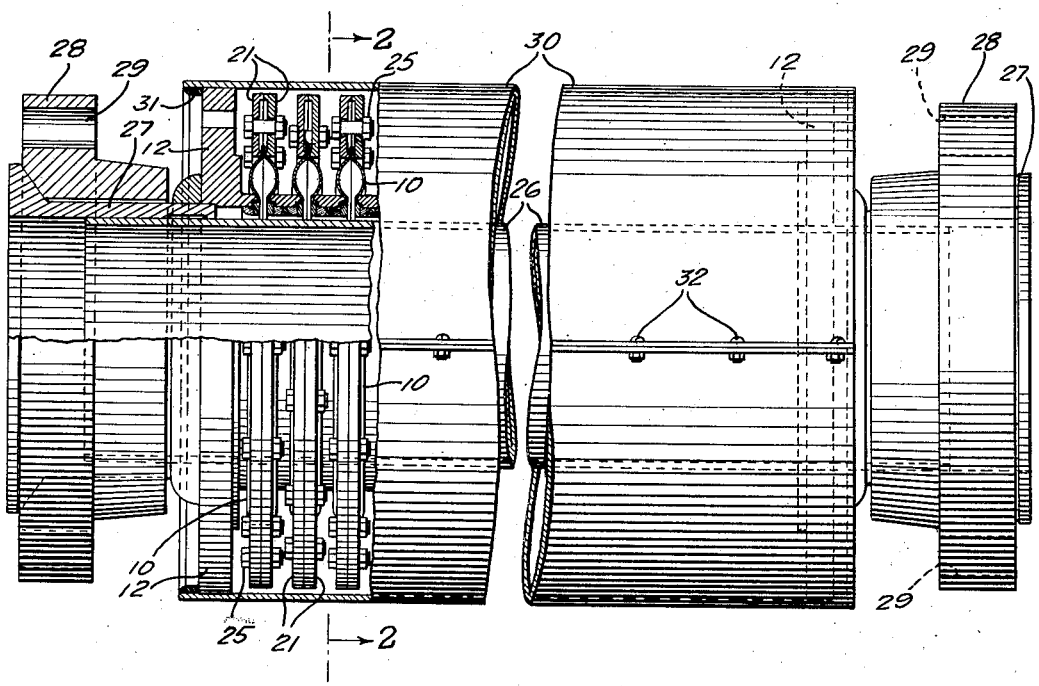
Fig. 1 is an elevational view, partly in section, of an expansion joint embodying the invention.
Figure 2:
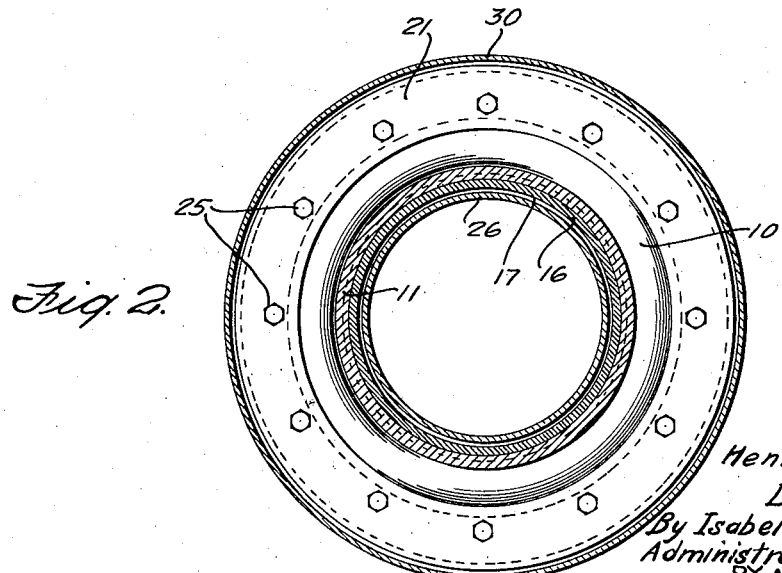
Fig. 2 is a transverse sectional view taken substantially on line 2—2 of Fig. 1.
Figure 3:
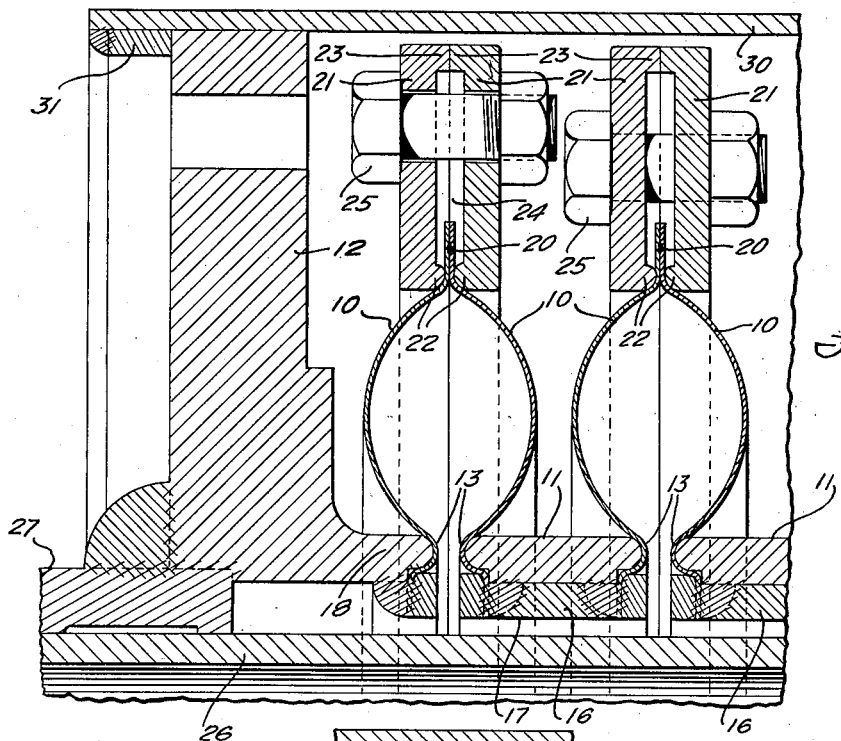
Fig. 3 is a longitudinal sectional view on an enlarged scale of part of the expansion joint shown in Fig. 1.

In assembling the bellows, after pairs of elements 10 have been secured together at their outer peripheral portions by seam welding, the inner portions are secured to the spacer rings 11 by welding, as previously described. Thereafter the retaining rings 21 are placed in position on each pair of elements and when the other parts of the bellows have been assembled, the bellows is subjected to hydraulic pressure applied interiorly thereof under sufficient pressure to bow the intermediate portions of the elements 10 outwardly, such as shown in Fig. 3. Under the hydraulic pressure imposed upon the pairs of elements 10 and the outward bowing of each of the plates of each pair, the outer periphery of each pair of elements will be drawn radially inwardly from the position shown in Fig. 4 to a position such as indicated in Fig. 3 with the welds 20 disposed radially outwardly of the flanges 22 on the retaining rings. When the elements 10 have been bowed outwardly to the extent desired by the action of hydraulic pressure, the pressure is released and the bellows is then ready for use.

The invention is independent of the size or shape of the elements or plates from which the bellows are fabricated and the thickness of plates used may vary over a comparatively wide range since definite control of the extent of separation of the plates is possible which provides control over the flexing of the individual elements or plates.

Since variations are possible in the form of the invention disclosed and the materials from which the bellows are made, it will be understood that the invention is not to be limited excepting by the scope of the appended claims.

What is claimed is:

1. Bellows having a movement absorbing portion comprising a plurality of thin metallic elements of substantial mechanical strength having openings therein, joined together in pairs radially inwardly of and adjacent their outer peripheries in fluid pressure tight relationship, with adjacent elements of each pair being secured at their inner peripheries in fluid pressure tight relationship to spacing members, and means engaging the outer surfaces of the elements of each pair radially inwardly of the joint between them adjacent their outer peripheries to support said joint, the portions of the elements intermediate said means and said spacing members having an outwardly convex configuration, the surfaces of said joint supporting means and said spacing members being uncorrugated and which are in contact with said elements being of curved configuration.

2. Bellows having a movement absorbing portion comprising a plurality of thin metallic elements of substantial mechanical strength having openings therein, joined together in pairs radially inwardly of and adjacent their outer peripheries in fluid pressure tight relationship, with adjacent elements of each pair being secured at their inner peripheries in fluid pressure tight relationship to spacing members, and means engaging the outer surfaces of the elements of each pair radially inwardly of the joint between them adjacent their outer peripheries to support said joint, the portions of the elements intermediate said means and said spacing members having an outwardly convex configuration, the surfaces of said joint supporting means which are in contact with said elements being of curved configuration.

3. Bellows having a movement absorbing portion comprising a plurality of thin metallic elements of substantial mechanical strength having openings therein, joined together in pairs radially inwardly of and adjacent their outer peripheries in fluid pressure tight relationship, with adjacent elements of each pair being secured at their inner peripheries in fluid pressure tight relationship to spacing members, and means engaging the outer surfaces of the elements of each pair radially inwardly of the joint between them adjacent their outer peripheries to support said joint, the portions of the elements intermediate said means and said spacing members having an outwardly convex configuration, the surfaces of said spacing members which are in contact with said elements being of curved configuration.

ISABEL TYTE LOCKWOOD,
*Administratrix of the Estate of Henry C. Lockwood, Deceased.*

CERTIFICATE OF CORRECTION.

Patent No. 2,223,691. December 3, 1940.

HENRY C. LOCKWOOD, deceased,
by ISABEL TYTE LOCKWOOD, ADMINISTRATRIX.

It is hereby certified that error appears in the printed specification of the above numbered patent requiring correction as follows: Page 2, first column, line 47, for the word "end" read --ends--; and second column, line 31, claim 1, strike out the words "being uncorrugated and" and insert the same after "members" in line 28, same claim; and that the said Letters Patent should be read with this correction therein that the same may conform to the record of the case in the Patent Office.

Signed and sealed this 14th day of January, A. D. 1941.

Henry Van Arsdale,
Acting Commissioner of Patents.

(Seal)